Patented Feb. 1, 1927.

1,616,168

UNITED STATES PATENT OFFICE.

WILLIAM C. ARSEM, OF SCHENECTADY, NEW YORK, ASSIGNOR TO INDUSTRIAL TECHNICS CORPORATION, OF SCHENECTADY, NEW YORK, A CORPORATION OF NEW YORK.

METHOD OF PURIFYING SUGAR JUICES.

No Drawing. Application filed May 16, 1921. Serial No. 469,947.

This invention relates to an improved method for purifying solutions containing sucrose.

In the clarification of beet sugar or cane sugar juices the customary practice hitherto has been to treat the juice according to one or the other of two principal methods. The first of these methods is commonly known as the method of defecation, and the second general method used is that known as carbonation, which is sometimes combined with a third method known as sulfitation.

In purifying raw beet juices, for example, by defecation just enough lime (calcium hydroxide) is used to neutralize the free acids of the juice and cause a separation of scum and sediment. The amount of lime required is between 0.5 and 1.0 per cent of the weight of the juice. It is important to use the exact amount required. With too little calcium hydroxide the clarification is incomplete, while with too much of this clarifying agent, some sugar is lost, due to the formation of an insoluble compound of the calcium and the sugar known as calcium sucrate. The treated juice under the best conditions is never quite clear, contains gummy substances and is difficult to filter. The juice clarified by this method is not suitable for the production of refined or white sugar but is employed usually for the production of so-called raw sugars which have a brown to brownish-black color. The defecation operation is conducted in three different kinds of equipment, viz:

(1) Small steam-heated pans;
(2) Continuous defecators (usually provided with intermittent settlers);
(3) Continuous superheaters (usually employed in combination with continuous settlers).

In the method of carbonation, an excess of lime is added to the juice relatively much greater in amount than that employed in the defecation process, amounting usually to 2½% to 4% of the weight of the juice. The treated juice is held at a temperature of about 55° C., and carbon dioxide is passed in until the liquid is nearly neutral. The treated juice is then filtered with plate and frame filter presses. The method of carbonation is suitable for the production of white or refined sugar, but in order to obtain a white refined product, the operation has always to be repeated, and the process is then called double carbonation. A third treatment is often necessary when the raw sugar contains unusual amounts of colored impurities. Moreover, before the juice can be considered pure enough to evaporate to the crystallizing or graining point, still another clarification treatment must be applied and for this final treatment the step known as sulfitation or sulfuring is ordinarily employed.

In carrying out sulfitation, milk of lime is added to the juice, then sulfur dioxide is passed in until the liquid is only faintly alkaline, and the liquid is then heated and filtered. With some grades of raw sugars this sulfitation step must be repeated in order to obtain a finished refined white sugar.

The entire procedure of carbonation and sulfitation is conducted in small units with many filter presses and pumps and a great deal of piping. Considerable labor is required and careful supervision is necessary. Much lime is required (about one-fourth as much as the amount of sugar produced), and a large amount of lime sludge has to be handled and disposed of.

The improved method of the present invention depends upon the discovery that the purification and clarification of sugar solutions and particularly of raw beet and cane sugar juices can be carried out more effectively, more rapidly, and with expenditure of much less labor by subjecting the raw juice to the combined action of a base, such as calcium hydroxide, and of a normal salt, such as calcium chloride. When this improved method is employed, most of the difficulties encountered in the older methods of treatment are entirely avoided. Thus, for example, the amount of sludge produced is relatively much less and is of a more compact and granular character, and can therefore be more readily filtered off in filter presses without clogging the filters. Filtration can therefore be carried out in a shorter period of time and much less filtering equipment is required, thus greatly reducing the cost of equipment and operation.

The improved method employs a relatively much less quantity of reagents and particularly less lime is required.

In many instances the amount of lime and calcium chloride required are together less than one-sixth of the lime required for the carbonation process, and the cost for clarifying-chemicals is therefore correspondingly less. The new method can be carried out in very large tanks in contradistinction to the multiplicity of smaller tanks required in the older carbonation and sulfitation methods. Also the method can be advantageously carried out in continuous heating and settling equipment. Furthermore, in many instances the clarification can, with advantage, first be partially effected by the older carbonation procedure and then completed by subjecting the partially clarified juices to the combined action of a base and a normal salt, preferably calcium hydroxide and calcium chloride, in accordance with the methods of the present invention. It may also be advisable in some cases to treat the juice first by our method and then give it a single sulphitation treatment, or to supplement the method of the present method by treatment with any selected older method. Much less labor is required for operating the simpler equipment and the labor is also greatly reduced by dispensing with the special lime kilns and the sulfur burners. Fuel is also saved to a very large extent.

One of the principal advantages of the present invention is the possibility of obtaining from raw sugar, and in many instances even from the raw beet or cane juice itself, a satisfactory refined white sugar by a single treatment of the sugar solution with the improved clarifying mixture as described.

In the practice of the present invention, I may take 100 lbs. of beet juice as it comes from the diffusion battery, add a solution of calcium chloride containing 0.25 lb. of the anhydrous salt, and a suspension of lime containing approximately 0.3 lb. of cilcium hydroxide, stopping the addition of the latter at a point such that the liquid is barely acid to phenol phthalein but alkaline to methyl red. The hydrogen ion concentration is therefore kept between $10^{-6}$ and $10^{-8}$. A moderate excess of calcium chloride is harmless but an excess of lime should be avoided. The liquid is now heated at 80° to 100° C., or even higher, until the impurities have separated, leaving a liquid free from turbidity. If the reaction becomes alkaline to phenol phthalein through the presence of excess lime, raw juice can be added to correct this condition before or during the boiling.

The clarified juice may now be run into continuous or intermittent settling equipment, or passed through filter presses, and then sent to the evaporators.

In some instances, when the impure sugar solutions are treated in accordance with the present invention, after clarification and filtering, the clarified solution may sometimes become slightly basic, and to correct this undesirable condition, I may merely add the necessary amount of acid, preferably hydrochloric acid.

Likewise, it may occasionally happen that the clarified and filtered juice may be slightly acid in character after filtration, and this condition is corrected by the addition of the required amount of base such as calcium hydroxide or sodium hydroxide, or the like.

Instead of calcium chloride, I may use other salts of calcium, such as the sulfate, sulfite, acetate, nitrate, etc. Instead of calcium salts, and calcium hydroxide, I may use the corresponding compounds of other metals or radicals. i. e., I may use any base such as sodium hydroxide, strontium hydroxide, potassium hydroxide and the like in place of the calcium hydroxide which is sufficiently strong to neutralize the acid produced by the calcium salt when the latter acts alone upon the impure sugar solution, and also in place of the calcium salt, such as calcium chloride, I may employ any other normal salt such as barium chloride or strontium chloride which when used alone has the power of precipitating impurities from the impure sucrose solution or of increasing the acidity of the said solution as a result of chemical reaction with the impurities contained therein.

Instead of adding the base such as $Ca(OH)_2$ and the salt $CaCl_2$ together they may be added alternately to the solution and in some instances this procedure is advisable.

While I do not wish to restrict the scope of my invention by any assumptions or theories as to the exact manner in which the combined action of the base and the normal salt brings about the highly advantageous results described, nevertheless I believe that the correct explanation of these results is along somewhat the following lines.

The behaviour of beet juice and other plant juices towards reagents is such as would be expected if they contained an acid salt of a radical "X" which forms an insoluble calcum salt; or, perhaps, a mixture of neutral salts and free acids which can be symbolized collectively by the formula MHX, in which M is one equivalent of any metal, probably chiefly Na, K, Mg, Al or Fe, and X is a radical of a polybasic acid such as malic, tartaric, phosphoric, pectic or saccharic acid, acid-protein or acid-albumin.

To precipitate the radical X in a neutral solution it is necessary to provide enough base to neutralize the acid properties of the substances symbolized at MHX, and enough of the Ca ion to precipitate all of the X-radical as CaX. The chief difficulty, previously unrecognized, is that the acidity and the radical X are not present in equivalent amounts. The ratio is usually very nearly 1:2, so that in formula MHX, X is assumed to be a divalent ion. If enough lime is added to react with all the radical X, some free alkali will be formed as indicated by the following equation.

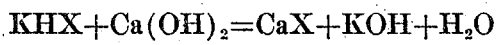
$KHX+Ca(OH)_2=CaX+KOH+H_2O$

In the presence of alkali, calcium salts of certain hydroxy-acids are soluble, or become peptized or colloidal in form, so that precipitation will be incomplete. If less lime is added, part of the radical X is still unprecipitated. This is why the defecation process, as formerly practiced, is imperfect.

If an excess of lime is used, and $CO_2$ passed in to neutralize it, the reaction tends to reverse as neutrality is approached, so that part of the radical X passes back into solution—

$CaX+KOH+CO_2=KHX+CaCO_3$

A certain alkalinity must be maintained to prevent this as far as possible, but too much entails loss of sugar in various ways. The carbonation process is a compromise at best, and has to be repeated two or three times.

By the new process, enough alkali is added to neutralize the acid properties of MHX, and enough Ca is provided to precipitate the radical X, as indicated by the following equations:

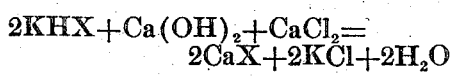
$2KHX+Ca(OH)_2+CaCl_2 = 2CaX+2KCl+2H_2O$ or

$KHX+NaOH+CaCl_2 = CaX+KCl+NaCl+H_2O$

In the claims the term "alkaline earth metal" is used in its strict sense to cover the elements calcium, strontium, barium and radium and does not include the other elements sometimes classified in group 2 of the periodic system, namely beryllium, magnesium, zinc, cadmium and mercury.

I claim:

1. The method of purifying solutions containing sucrose, which comprises precipitating the impurities from the impure solution of sucrose by subjecting the solution to the action of a base more basic than calcium carbonate and a normal alkaline earth metal salt of an acid stronger than carbonic acid, which salt alone is capable of precipitating impurities from the impure sucrose solution, the amount of base and alkaline earth metal salt being sufficient to maintain the hydrogen ion concentration between $10^{-6}$ and $10^{-8}$ and the amount of alkaline earth metal ion being sufficient to react with all of the precipitable impurities in the solution.

2. The process of purifying solutions containing sucrose, which comprises precipitating the impurities from the impure solution of sucrose by subjecting it to the action of a base more basic than calcium carbonate and a normal alkaline earth metal salt, which salt alone is capable of reacting with the impurities in the solution to produce increased acidity therein, the amount of base and alkaline earth metal salt being sufficient to maintain the hydrogen ion concentration between $10^{-6}$ and $10^{-8}$ and the amount of alkaline earth metal ion being sufficient to react with all of the precipitable impurities in the solution.

3. The method of purifying solutions containing sucrose, which comprises precipitating the impurities from the impure solution of sucrose by submitting it to the action of calcium hydroxide and a normal alkaline earth metal salt of an acid stronger than carbonic acid, which salt alone is capable of precipitating impurities from the impure sucrose solution, the amount of base and alkaline earth metal salt being sufficient to maintain the hydrogen ion concentration between $10^{-6}$ and $10^{-8}$ and the amount of alkaline earth metal ion being sufficient to react with all of the precipitable impurities in the solution.

4. The method of purifying solutions containing sucrose, which comprises precipitating the impurities from the impure solution of sucrose by subjecting it to the action of a base more basic than calcium carbonate and a normal non-oxidizing salt of an alkaline earth metal and an acid stronger than carbonic acid.

5. The method of purifying solutions containing sucrose, which comprises precipitating the impurities from the impure solution of sucrose by submitting it to the action of an alkaline earth metal base more basic than calcium carbonate and a normal non-oxidizing alkaline earth metal salt of an acid stronger than carbolic acid.

6. The method of purifying solutions containing sucrose, which comprises precipitating the impurities from the impure solution of sucrose by submitting it to the action of calcium hydroxide and calcium chloride.

7. The process of purifying solutions containing sucrose, which comprises precipitating the impurities from the impure solution of sucrose by submitting it to the action of calcium hydroxide and calcium chloride and heating the solution.

8. The process of purifying solutions containing sucrose, which comprises precipitating the impurities from the impure solution of sucrose by submitting it to the action of a base and a normal salt, which salt alone is capable of precipitating impurities from the impure solution, and adjusting the acidity of the solution approximately to such a strength that the solution shows an acid reaction toward phenolphthalein but an alkaline reaction toward methyl red.

9. The method of purifying solutions containing sucrose, which comprises precipitating the impurities from the impure solution of sucrose by submitting it to the action of an alkaline earth metal base and a normal alkaline earth metal salt, and adjusting the acidity of the solution approximately to such a strength that the solution shows an acid reaction toward phenolphthalein but an alkaline reaction toward methyl red.

10. The method of purifying solutions containing sucrose, which comprises subjecting the impure solution of sucrose to the action of calcium hydroxide and calcium chloride, and adjusting the acidity of the solution approximately to such a strength that the solution shows an acid reaction toward phenolphthalein but an alkaline reaction toward methyl red, substantially as described.

11. The process of purifying solutions containing sucrose, which comprises precipitating the impurities from the impure solution of sucrose by submitting it to the action of a base and a normal salt, which salt alone is capable of precipitating impurities from the impure sucrose solution, and adjusting the acidity of the solution approximately to such a strength that the solution shows an acid reaction toward phenolphthalein but an alkaline reaction toward methyl red and heating the solution.

12. The method of purifying solutions containing sucrose, which comprises subjecting the impure solution of sucrose to the action of calcium hydroxide and calcium chloride, and adjusting the acidity of the solution approximately to such a strength that the solution shows an acid reaction toward phenolphthalein but an alkaline reaction toward methyl red and heating the solution, substantially as described.

13. The process of purifying solutions containing sucrose, which comprises precipitating the impurities from the impure solution of sucrose by submitting it to the action of a base more basic than calcium carbonate and a normal non-oxidizing salt of an alkaline earth metal and an acid stronger than carbonic acid, which salt alone is capable of precipitating impurities from the impure sucrose solution, and heating the solution.

14. The method of purifying solutions containing sucrose, which comprises precipitating the impurities from the impure solution of sucrose by subjecting the solution to the action of an aqueous dispersion of a base more basic than calcium carbonate and a normal alkaline earth metal salt of an acid stronger than carbonic acid which salt alone is capable of precipitating impurities from the impure sucrose solution, the amount of base and alkaline earth metal salt being sufficient to maintain the hydrogen ion concentration between $10^{-6}$ and $10^{-8}$ and the amount of alkaline earth metal ion being sufficient to react with all of the precipitable impurities in the solution.

15. The process of purifying solutions containing sucrose, which comprises precipitating the impurities from the impure solution of sucrose by subjecting it to the action of an aqueous dispersion of a base more basic than calcium carbonate and a normal alkaline earth metal salt of an acid stronger than carbonic acid, which salt alone is capable of reacting with the impurities in the solution to procure increased acidity therein, the amount of base and alkaline earth metal salt being sufficient to maintain the hydrogen ion concentration between $10^{-6}$ and $10^{-8}$ and the amount of alkaline earth metal ion being sufficient to react with all of the precipitable impurities in the solution.

16. The method of purifying solutions containing sucrose, which comprises precipitating the impurities from the impure solution of sucrose by submitting it to the action of an aqueous dispersion of calcium hydroxide and a normal alkaline earth metal salt of an acid stronger than carbonic acid, which salt alone is capable of precipitating impurities from the impure sucrose solution, the amount of base and alkaline earth metal salt being sufficient to maintain the hydrogen ion concentration between $10^{-6}$ and $10^{-8}$ and the amount of alkaline earth metal ion being sufficient to react with all of the precipitable impurities in the solution.

17. The method of purifying solutions containing sucrose, which comprises precipitating the impurities from the impure solution of sucrose by subjecting it to the action of an aqueous dispersion of a base more basic than calcium carbonate and a normal non-oxidizing salt of an alkaline earth metal and an acid stronger than carbonic acid.

18. The method of purifying solutions containing sucrose, which comprises precipitating the impurities from the impure solution of sucrose by submitting it to the action of an aqueous dispersion of an alkaline earth metal base more basic than calcium carbonate and a normal non-oxidizing alkaline earth metal salt of an acid stronger than carbonic acid.

19. The method of purifying solutions containing sucrose, which comprises precipitating the impurities from the impure solution of sucrose by submitting it to the action of an aqueous dispersion of calcium hydroxide and calcium chloride.

20. The method of purifying solutions containing sucrose, which comprises precipitating the impurities from the impure solution of sucrose by subjecting the solution to the action of a base more basic than calcium carbonate and an alkaline earth metal salt of an acid stronger than carbonic acid without intermediate filtration, which salt alone is capable of precipitating impurities from the impure sucrose solution, the amount of base and alkaline earth metal salt being sufficient to maintain the hydrogen ion concentration between $10^{-6}$ and $10^{-8}$ and the amount of alkaline earth metal ion being sufficient to react with all of the precipitable impurities in the solution.

21. The process of purifying solutions containing sucrose, which comprises precipitating the impurities from the impure solution of sucrose by subjecting it to the action of a base more basic than calcium carbonate and an alkaline earth metal salt of an acid stronger than carbonic acid without intermediate filtration, which salt alone is capable of reacting with the impurities in the solution to produce increased acidity therein, the amount of base and alkaline earth metal salt being sufficient to maintain the hydrogen ion concentration between $10^{-6}$ and $10^{-8}$ and the amount of alkaline earth metal ion being sufficient to react with all of the precipitable impurities in the solution.

22. The method of purifying solutions containing sucrose, which comprises precipitating the impurities from the impure solution of sucrose by submitting it to the action of calcium hydroxide and an alkaline earth metal salt of an acid stronger than carbonic acid without intermediate filtration, which salt alone is capable of precipitating impurities from the impure sucrose solution, the amount of base and alkaline earth metal salt being sufficient to maintain the hydrogen ion concentration between $10^{-6}$ and $10^{-8}$ and the amount of alkaline earth metal ion being sufficient to react with all of the precipitable impurities in the solution.

23. The method of purifying solutions containing sucrose, which comprises precipitating the impurities from the impure solution of sucrose by subjecting it to the action of a base more basic than calcium carbonate and a non-oxidizing salt of an alkaline earth metal and an acid stronger than carbonic acid without intermediate filtration.

24. The method of purifying solutions containing sucrose, which comprises precipitating the impurities from the impure solution of sucrose by submitting it to the action of an alkaline earth metal base more basic than calcium carbonate and a non-oxidizing alkaline earth metal salt of an acid stronger than carbonic acid without intermediate filtration.

25. The process of purifying solutions containing sucrose, which comprises precipitating the impurities from the impure solution of sucrose by submitting it to the action of a base more basic than calcium carbonate and a salt of an alkaline earth metal and an acid stronger than carbonate acid without intermediate filtration, which salt alone is capable of precipitating impurities from the impure sucrose solution, and heating the solution, the amount of base and alkaline earth metal salt being sufficient to maintain the hydrogen ion concentration between $10^{-6}$ and $10^{-8}$ and the amount of alkaline earth metal ion being sufficient to react with all of the precipitable impurities in the solution.

26. The process of purifying solutions containing sucrose, which comprises precipitating the impurities from the impure solution of sucrose by submitting it to the action of a base and a salt, without intermediate filtration, which salt alone is capable of precipitating impurities from the impure solution, and adjusting the acidity of the solution approximately to such a strength that the solution shows an acid reaction toward phenolphthalein but an alkaline reaction toward methyl red.

27. The method of purifying solutions containing sucrose, which comprises precipitating the impurities from the impure solution of sucrose by submitting it to the action of an alkaline earth metal base and an alkaline earth metal salt without intermediate filtration, and adjusting the acidity of the solution approximately to such a strength that the solution shows an acid reaction toward phenolphthalein but an alkaline reaction toward methyl red.

28. The process of purifying solutions containing sucrose, which comprises precipitating the impurities from the impure solution of sucrose by submitting it to the action of a base and a salt without intermediate filtration, which salt alone is capable of precipitating impurities from the impure sucrose solution, and adjusting the acidity of the solution approximately to such a strength that the solution shows an acid reaction toward phenolphthalein but an alkaline reaction toward methyl red, and heating the solution.

29. The process of purifying solutions containing sucrose, which comprises precipitating the impurities from the impure solution of sucrose by submitting it to the action of a base more basic than calcium carbonate and a non-oxidizing salt of an alkaline earth metal and an acid stronger than carbonic acid without intermediate filtration, which salt alone is capable of precipitating impurities from the impure sucrose solution, and heating the solution.

In testimony whereof I affix my signature.

WILLIAM C. ARSEM.